United States Patent [19]

Stott

[11] Patent Number: 5,555,633
[45] Date of Patent: Sep. 17, 1996

[54] SCALE ASSEMBLY

[75] Inventor: Christopher Stott, Chellaston, England

[73] Assignee: LK Limited, Derby, United Kingdom

[21] Appl. No.: 374,587

[22] PCT Filed: Jul. 13, 1993

[86] PCT No.: PCT/GB93/01466

§ 371 Date: Jan. 20, 1995

§ 102(e) Date: Jan. 20, 1995

[87] PCT Pub. No.: WO94/02800

PCT Pub. Date: Feb. 3, 1994

[30] Foreign Application Priority Data

Jul. 24, 1992 [GB] United Kingdom ............ 9215767

[51] Int. Cl.$^6$ .................................................. G01B 5/008
[52] U.S. Cl. ....................................... 33/704; 33/503
[58] Field of Search ..................... 33/704, 702, 703, 33/503, DIG. 19

[56] References Cited

U.S. PATENT DOCUMENTS

| 4,593,471 | 6/1986 | Nelle | 33/702 |
| 4,776,098 | 10/1988 | Nelle | 33/702 |
| 4,912,856 | 4/1990 | Ernst | 33/702 |
| 5,031,331 | 7/1991 | Herzog et al. | 33/702 |
| 5,095,632 | 3/1992 | Hassler, Jr. et al. | 33/704 |
| 5,182,867 | 2/1993 | Nelle | 33/702 |
| 5,375,338 | 12/1994 | Nelle | 33/704 |

FOREIGN PATENT DOCUMENTS

| 0110059 | 6/1984 | European Pat. Off. . |
| 0247353 | 12/1987 | European Pat. Off. . |
| 3503804 | 7/1986 | Germany . |
| 9205393 | 6/1992 | Germany . |

*Primary Examiner*—Christopher W. Fulton
*Attorney, Agent, or Firm*—Dellett and Walters

[57] ABSTRACT

A guideway 10 of a guideway set in a coordinate measuring machine has a scale in the form of a metal strip clamped and bonded to an accessible face 46 of a spar 30, the latter being formed of a thermally stable material and being connected at one end to a reference position defined by a bracket 18 and a mounting plate 16 on the guideway 10. The spar 30 is mounted on the guideway 10 by spaced blocks 34 which are designed to accommodate any longitudinal movement of the guideway 10 due to thermal expansion, so that the spar 30 and the scale are effectively maintained in position. Because relative movement between the spar 30 and the scale is substantially prevented, the position of the scale is substantially fixed, providing improved scale accuracy.

12 Claims, 2 Drawing Sheets

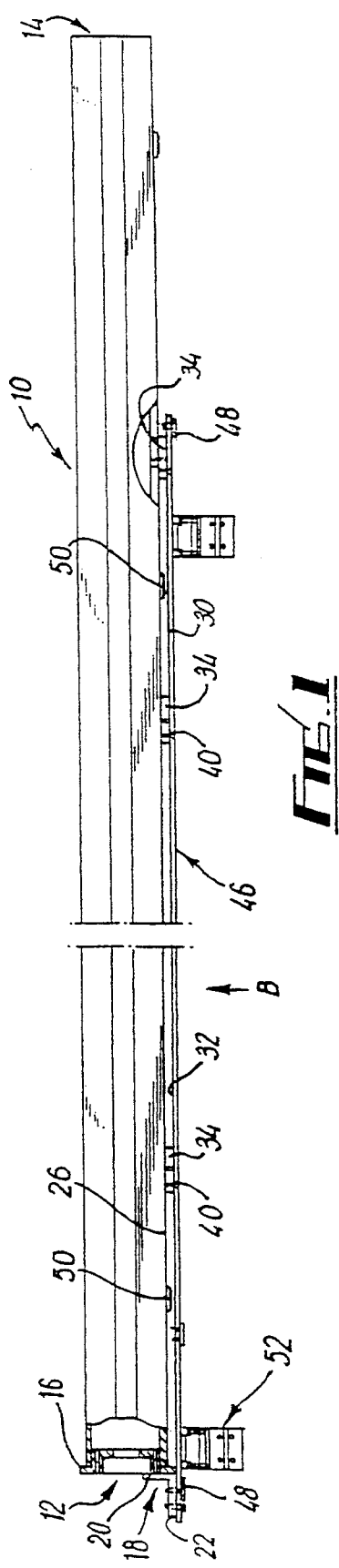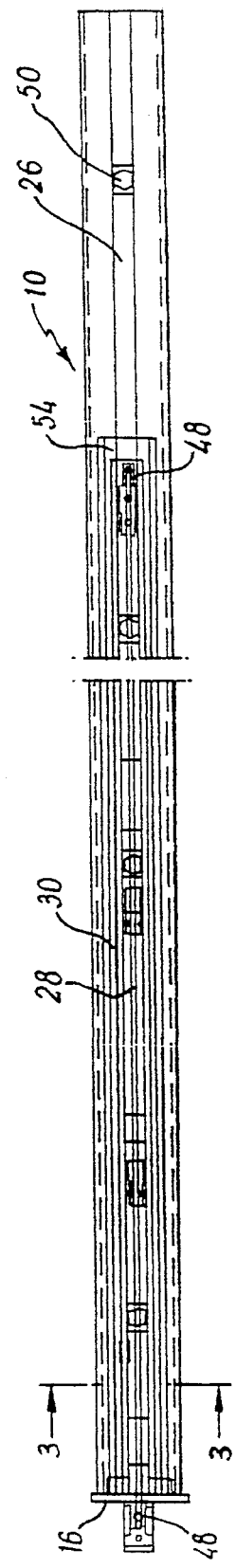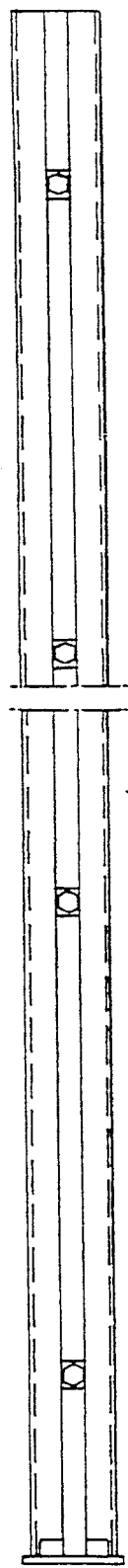

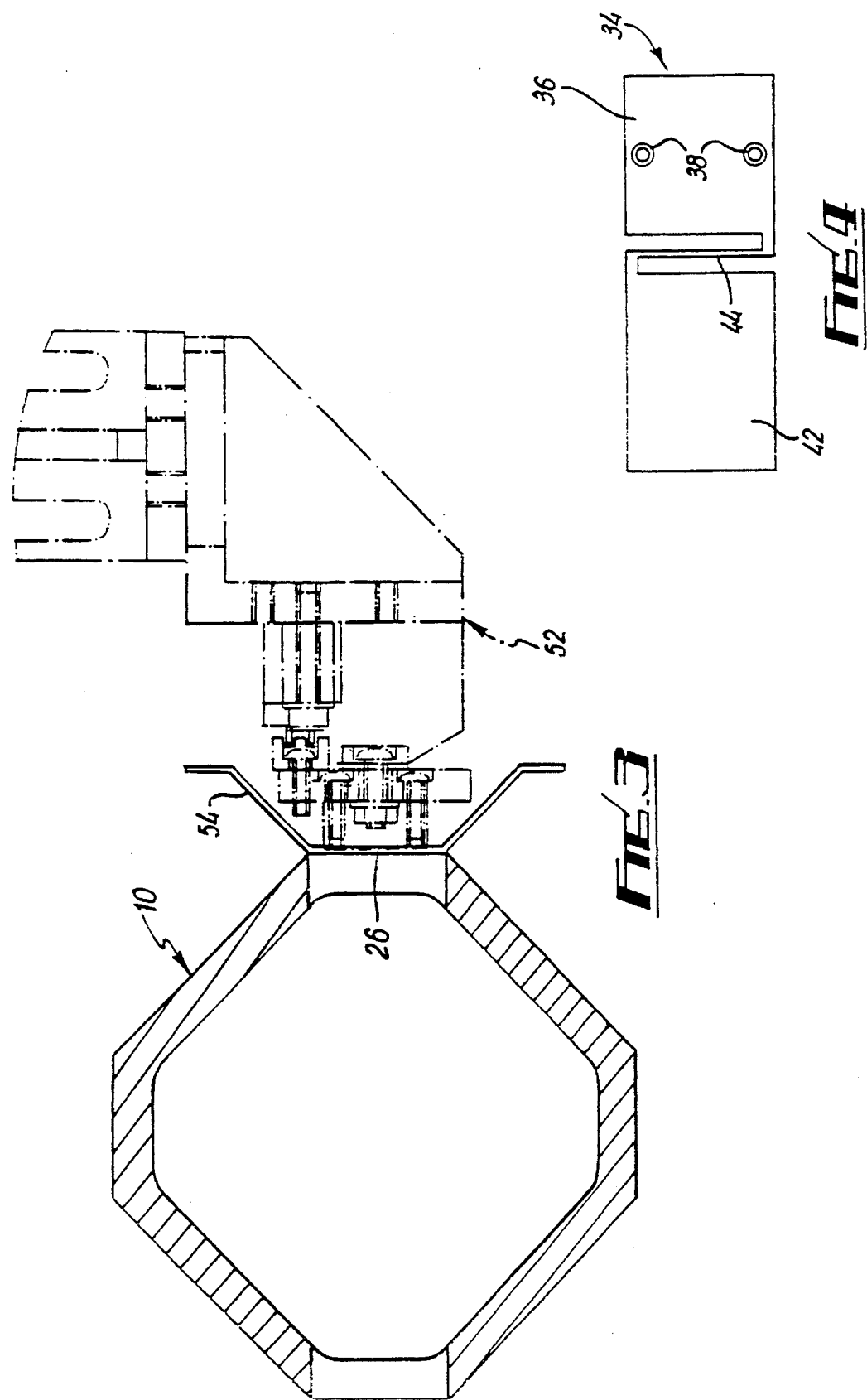

SCALE ASSEMBLY

This invention relates to a scale assembly for use in monitoring movement of a component on a structure, and is particularly but not exclusively concerned with monitoring movement of a component on a linear guideway of a high accuracy measuring and checking machine.

For purposes of accuracy, it is necessary to construct coordinate measuring machines using either heavyweight materials, such as granite, which remain as stable as possible with variations in temperature, in order that guideways of the machine do not distort and thereby detract from the accuracy of measurement, or special designs of mountings for the guideways which can accommodate differential thermal expansion between the materials used. However, irrespective of the construction used, there remains a problem with scales which are mounted on the guideways for use in a non-contact linear encoder system. Some such scales have been made of a non-thermally stable material and, as the guideways require to be made of a material whose surface can be machined to a high accuracy, and therefore inevitably a non-thermally stable material, there still results a differential thermal expansion between the materials off the scale and the guideway. Other scales are expensive and have length limitations.

In DE-U-9205393, an arrangement for measuring the relative positions of two objects mounts a scanning unit on one of the objects, positioned to scan a graduated scale on the other object in order to obtain positional data. The design of the prior device attempts to make the scale predictable in terms of length change due to temperature change, in order to allow the user to be able to compensate for that change. The intention is to avoid the need for all the various components to be made from materials with the same coefficient of thermal expansion. Such a design is not, however, appropriate for use in a high accuracy measuring and checking machine, where it is desirable to maintain the scale in the same spatial position regardless of temperature changes.

According to the present invention there is provided a scale assembly for use in monitoring movement of a component on a guideway structure, the assembly comprising an elongate scale, a support for the scale, and means for fixedly mounting the support on the structure at one reference location and flexibly mounting the support on the structure at another location, characterised in that, in order to substantially prevent a change in the spatial position of the scale due thermal expansion of materials used, the support is formed of a thermally stable material, and means fixedly secures the scale to the support to substantially prevent relative movement therebetween, the positions of the fixed and flexible mountings for the support on the structure accommodating movement of the latter due to thermal expansion thereof, without changing the spatial position of the support and therefore the scale.

Preferably the scale is in the form of a metal tape which may be produced to have an indefinite longitudinal dimension and may be cut to a required length. The securing means may comprise an adhesive layer provided on a face of the tape opposed to a scaled face thereof, and a component for clamping each end of the tape to the support.

Preferably also the support is formed as an elongate strip, for example of unidirectional carbon fibre material. Alternatively the strip may be formed of INVAR or the like. The strip may be formed with an indefinite longitudinal dimension and may be cut to a desired length.

The flexible mounting means for the strip may include a plurality of blocks, each of which may be formed of two hinged parts, one of which parts is secured to the support and the other of which parts adapted to be secured to the structure. Each block may be formed of aluminum with an integrally formed flexible section defining the hinge.

Alternatively the flexible mounting means for the strip may comprise a sealant which can be applied in flowable state to extend between each side of the support and the structure over part all of the length of the former, the sealant remaining flexible when set.

A tape matching the scaled tape may be secured to an opposed face of the support, and the or each tape may locate in a complementary recess in the support whereby the or each respective face of the latter remains planar.

The present invention also provides apparatus for use in monitoring the movement of a component, said apparatus comprising elongate guide means on which the component is adapted to be mounted for movement there-along, characterised by a scale assembly as described in any of the six preceding paragraphs mounted in association with the elongate guide means, the component providing reading means for non-contact association with the scale for monitoring movement of the component.

The invention Further provides a coordinate measuring machine characterised by an apparatus as described in the preceding paragraph for guiding a respective component along at least one of the coordinate axes.

An embodiment of the present invention will now be described by way of example only, with reference to the accompanying drawings, in which:

FIG. 1 is a side view of a guideway set for a coordinate measuring machine incorporating a scale assembly according to the invention;

FIG. 2 is a view of the guideway set of FIG. 1 in the direction of arrow B;

FIG. 3 is a section along line 3—3 of FIG. 2; and

FIG. 4 is a plan of a component of the scale assembly.

Referring to the drawings, there is shown a guideway 10 of guideway set in a coordinate measuring machine adapted to mount a carriage (not shown) for movement on a column along the Z axis, i.e. the guideway 10 is upstanding in use having a lower end 12 and an upper end 14. The guideway 10 has a tubular form of octagonal cross-section as shown in FIG. 3, and is preferably made of a ceramic material bonded at its lower end 12 to a mounting plate 16, the mounting position of the latter being non-movable relative to the column of the machine, and therefore being an effective reference position.

A substantially L-shaped bracket 18 has one leg 20 attached to the mounting plate 16 with the other leg 22 providing a mounting face spaced outwardly of a respective end wall 26 of the guideway 10 for a purpose hereinafter described.

The machine is provided with a non-contact linear encoder system including a scale assembly mounted along the end wall 26 of the guideway 10. The scale assembly consists of a scale 28 in the form of a metal strip, for example a gold-plated steel strip which is accurately scaled on one face and on the opposed face has a layer of adhesive. The scale 28 is normally provided with a removable cover over the adhesive and in roll form whereby the scale 28 can be cut to any desired length. The adhesive is preferably a contact adhesive whereby the scale 28 can be bonded to a desired substrate by the application of manual pressure.

The scale assembly further includes an elongate component in the form of a strip or spar 30 formed of a thermally stable material, preferably unidirectional carbon fibre. The spar 30 has a rectangular cross-section and can be accurately formed and then cut to any desired length. As an alternative, the spar 30 may be formed of any other suitable thermally stable material such as INVAR. To one side face 32 of the spar 30 are attached a plurality of blocks 34 for mounting the spar 30 on the end wall 26 of the guideway 10. The blocks 34 are optimally spaced along the length of the spar 30.

As shown in FIG. 4, each block 34, preferably formed of aluminum, is formed of two parts, a first part 36 being provided with mounting apertures 38 through which suitable fixing screws 40 (FIG. 1) can secure the block 34 to the spar 30. The second part 42 is adapted to be bonded, at the opposed side from the spar 30, to the end wall 26 of the guideway 10. The parts 36, 42 are connected at opposite edges by an integrally formed strip 44 so dimensioned as to enable flexibility and therefore acting effectively as a hinge between the parts 36, 42.

After the blocks 34 are mounted on the spar 30, but before the blocks 34 are bonded to the guideway 10, the spar 30 is secured at one end to the bracket 18. The spar 30 then extends upwardly parallel to the guideway 10 and the blocks 34 are secured to the guideway end wall 26.

The scale 28 with the adhesive side-exposed is then applied to the accessible side face 46 of the spar 30, and each end of the scale 28 is clamped to the spar 30 by a suitable clamping assembly 48, the latter including the bonding of a clamping component in position over the respective end of the scale 28. The cross-section of the spar 30 is selected to be substantially larger than the cross-section of the scale 28. This is because the coefficient of expansion of the composite assembly is dependent upon the coefficient of expansions of the two materials and their relative cross-sectional areas.

The connection of the thermally stable spar 30 to a reference position effectively maintains the position of the spar 30, and although the latter is mounted on the guideway 10, any longitudinal movement of the latter due to thermal expansion can be accommodated by the hinged blocks 34. As the mounting of the scale 28 on the spar 30 substantially prevents relative movement between these two components, the position of the scale 28 is substantially fixed, providing considerably improved scale accuracy relative to existing scale arrangements.

The mounting of the guideway on a thermally stable part of the machine by means of specially designed bars (not shown), which can accommodate differential thermal expansion between different materials, is provided for by means of the blocks 34, which space the spar 30 from the end wall 26 of the guideway 10 so that the spar 30 can overlie protruding ends 50 of the bars. Where such bars are not utilized, the flexible mounting of the spar 30 on the guideway 10 can alternatively be achieved by means of a sealant strip along the length of the spar 30 and extending between a lower edge thereof and the end wall 26 of the guideway 10. The sealant strip may be formed of silicon and may alternatively be used in small sections spaced along the length of the spar 30.

In use, a reading head 52 is mounted for movement with the component and scans the scale 28. A draught shield 54 is provided. The head 52, which forms no part of the present invention, produces signals for interpolation by an associated computer, with the fixing of the scale 28 providing a suitable reference point to assist in interpolation.

It is to be appreciated that the scale assembly can be applied to any guideway of a coordinate measuring machine and can be used in other suitable applications. Depending on the guideway design, it may be more appropriate to fix the scale assembly to a reference position by securing the spar 30 with respect to one of the bars mounting the guideway on the column.

In a modification, the spar 30 may be formed with an elongate groove on the side face 32 wherein the scale 28 can locate to thereby lie flush with the remainder of the face 32. It is also envisaged that it may be preferable to counterbalance any distortion caused by thermal expansion of the metal scale 28, however small, by the application of a similar metal strip, not necessarily scaled, to the other side face of the spar 30. It will also be appreciated that, if such an additional strip is used, the spar 30 may also be formed with a central groove to accommodate same.

There is thus provided a long axis scale for a coordinate measuring machine which is considerably less susceptible to distortion due to thermal expansion than presently existing scales, and yet which is inexpensive to produce and simple to install. The accuracy of a machine utilizing such a scale assembly is considerably enhanced.

Various other modifications may be made without departing from the invention. For example, the flexible blocks may be of any other suitable design, and indeed the spar may be flexibly mounted on the guideway by any other suitable arrangement.

I claim:

1. A scale assembly for use in monitoring movement of a component on a guideway structure of a coordinate measuring machine, the assembly comprising an elongate scale, a support for the scale, mounting means for fixedly mounting the support relative to the structure at one reference location and flexibly mounting the support on the structure at another location, securing means for fixedly securing the scale to the support to substantially prevent relative movement therebetween, and connecting means for non-movably connecting the structure to the machine, the support being fixedly mounted on the connecting means and being formed of a thermally stable material whereby to be capable of fixing the spatial position of the support relative to the machine, the flexible mounting for the support on the structure accommodating movement of the latter due to thermal expansion of the material thereof, without changing the spatial position of the support and therefore the scale.

2. An assembly according to claim 1 wherein the scale is in the form of a metal tape.

3. An assembly according to claim 2 wherein the tape is produced to have an indefinite longitudinal dimension and is cut to a required length.

4. An assembly according to claim 2 wherein the securing means comprises an adhesive layer provided on a face of the tape opposed to a scaled face thereof, and a component for clamping each end of the tape to the support.

5. An assembly according to claim 1 wherein the support is formed as an elongate strip having an indefinite longitudinal dimension and being cut to a desired length.

6. An assembly according to claim 5 wherein the strip is formed of unidirectional carbon fibre material.

7. An assembly according to claim 5 wherein the strip is formed of INVAR.

8. An assembly according to claim 1 wherein the flexible mounting means includes a plurality of blocks, each of which may be formed of two hinged parts, one of which parts is secured to the support and the other of which parts is adapted to be secured to the structure.

9. An assembly according to claim 8 wherein each block is formed of aluminum with an integrally formed flexible section defining the hinge.

10. An assembly according to claim 1 wherein the flexible mounting means comprises a sealant which can be applied in a flowable state to extend between each side of the support and the structure over part or all of the length of the former, the sealant remaining flexible when set.

11. Apparatus for use in monitoring the movement of a component, said apparatus comprising elongate guide means on which the component is adapted to be mounted for movement therealong, and a scale assembly according to claim 1 mounted in association with the elongate guide means, the component providing reading means for non-contact association with the scale for monitoring movement of the component.

12. A coordinate measuring machine having an apparatus according to claim 11 for guiding a respective component along at least one of the coordinate axes.

* * * * *